United States Patent
Sen et al.

(10) Patent No.: US 6,889,528 B2
(45) Date of Patent: May 10, 2005

(54) PROCESS OF MAKING RARE EARTH DOPED OPTICAL FIBER

(75) Inventors: Ranjan Sen, Calcutta (IN); Minati Chatterjee, Calcutta (IN); Milan Kanti Naskar, Calcutta (IN); Mrinmay Pal, Calcutta (IN); Mukul Chandra Paul, Calcutta (IN); Shyamal Kumar Bhadra, Calcutta (IN); Kamal Dasgupta, Calcutta (IN); Dibyendu Ganguli, Calcutta (IN); Tarun Bandyopadhyay, Calcutta (IN); Aharon Gedanken, Ramat-Gan (IL)

(73) Assignees: Council of Scientific & Industrial Research, New Delhi (IN); Bar-Ilan University, Ramat-Gan (IL)

( * ) Notice: Subject to any disclaimer, the term of this patent is extended or adjusted under 35 U.S.C. 154(b) by 377 days.

(21) Appl. No.: 09/982,946

(22) Filed: Oct. 22, 2001

(65) Prior Publication Data

US 2004/0187524 A1 Sep. 30, 2004

(51) Int. Cl.$^7$ .................................................. G02B 6/00
(52) U.S. Cl. .............................. 65/390; 65/395; 65/396; 65/399; 65/440
(58) Field of Search .......................... 65/395, 396, 390, 65/399, 440

(56) References Cited

U.S. PATENT DOCUMENTS 6,391,808 B1 * 5/2002 Stiegman ..................... 501/12
6,523,369 B1 * 2/2003 Zhang et al. .................. 65/419
6,537,665 B2 * 3/2003 O'Connor et al. ............ 428/402
6,538,974 B2 * 3/2003 Wilde et al. ............ 369/112.01

* cited by examiner

Primary Examiner—Peter Chin
(74) Attorney, Agent, or Firm—Sughrue Mion, PLLC (57) ABSTRACT

The present invention discloses a process for making rare earth (RE) doped optical fiber by using RE oxide coated silica nanoparticles as the precursor material, more particularly the method of the present invention involves preparation of stable dispersions (sol) of RE oxide coated silica nanoparticles at ambient temperature and applying a thin coating on the inner surface of silica glass tube following dip coating technique or any other conventional methods, of the said silica sol containing suitable dopants selected from Ge, Al, P, etc., the coated tubes were further processed into optical preforms by following MCVD technique and fiberized in desired configuration, the novelty lies in eliminating the step of the formation of porous soot layer at high temperature by CVD process inside a fused silica glass tube for formation of the core and also in the elemination of the incorporation of the rare earth ions into the porous soot layer following the solution doping technique or other conventional methods, the direct addition of RE oxides in the sol eliminates the formation of microcrystalites and clusters of rare earth ions and prevents change in composition including variation of RE concentration in the core which results in increase in the reproducibility and reliability of the process to a great extent, further the addition of Ge(OET)$_4$ at ambient temperature in the silica sol reduces the quantity of GeCl$_4$ which is required at high temperature to achieve the desired Numerical Aperture.

40 Claims, 2 Drawing Sheets

Fig. 1: Spectral attenuation curve of Er doped fibre fabricated by using RE coated silica nanoparticles Fig. 2: Spectral attenuation curve of Er-doped fibre fabricated by 'solution doping' process at CGCRI Fig. 3: Refractive index profile of Er doped fibre fabricated through nanoparticle route.

Fig. 4: Refractive index profile of Er doped fibre fabricated by following solution doping technique

PROCESS OF MAKING RARE EARTH DOPED OPTICAL FIBER

FIELD OF THE INVENTION

The present invention relates to a Process of Making Rare Earth Doped Optical Fibre.

BACKGROUND ART

High silica based optical fibres are firmly established as the most efficient interconnection media for optical telecommunication networks. The fibres are used as the passive transmission media to guide optical signals over long distances. In contrast, rare-earth (RE) ions if doped into the core of such fibres, make them optically active due to the characteristic emission of the RE when pumped at suitable wavelengths. Because of this property RE doped fibres have shown great potential for use as active devices for photonic applications like optical amplifiers and fibre lasers at various wavelengths. The fibres are also found to be promising candidates for their application as sensors for monitoring temperature, radiation dose etc.

Erbium doped fiber which is the active medium of an EDFA (erbium doped fiber amplifier) has been an enabling technology for optical networks operating in the third telecommunication window between 1530 and 1610 nm. EDFA can simultaneously amplify several optical channels in a single fibre which has enabled the implementation of DWDM (dense wavelength division multiplexing) technology with the potential of increasing the bandwidth of long distance transmission systems from Gb/s to Tb/s ranges. EDFAs exhibit high gain, large bandwidth, low noise, polarisation insensitive gain, substantially reduced cross talk problems and low insertion losses at the operating wavelengths. The deployment of EDFA has spurred a tremendous growth in advanced telecommunication systems replacing the conventional optoelectronic repeaters. While the Erbium Doped Fibre (EDF) remains the most important for telecommunication applications, fibres doped with other rare earths are gaining importance mostly for development of laser sources from visible to mid infrared regions. Development of broadband amplifiers commencing from 1300 nm is an area of great interest using various REs. Lasing and amplification have been demonstrated at several wavelengths with the incorporation of the various rare-earths.

Reference may be made to Townsend J. E., Poole S. B., and Payne D. N., Electronics Letters, Vol. 23 (1987) p-329, 'Solution-doping technique for fabrication of rare-earth-doped optical fibre' wherein the Modified Chemical Vapour Deposition (MCVD) process is used to fabricate the preform with a step index profile and desired core-clad structure while solution doping is adopted for incorporation of the active ion. The steps involed in the process are as follows:

- A conventional cladding doped with $P_2O_5$ and F is deposited within a high silica glass substrate tube to develop matched clad or depressed clad type structure.
- The core layers of predetermined composition containing index raising dopant like $GeO_2$ are deposited at a lower temperature to form unsintered porous soot.
- The tube with the deposit is immersed into an aqueous solution of the dopant precursor (typical concentration 0.1 M) up to 1 hour. Any soluble form of the dopant ion is suitable for preparation of the solution although rare earth halides have been mostly used.
- Following immersion, the tube is rinsed with acetone and remounted on lathe.
- The core layer containing the RE is dehydrated and sintered to produce a clear glassy layer. Dehydration is carried out a temperature of 600° C. by using chlorine. The level of OH⁻ is reduced below 1 ppm using $Cl_2/O_2$ in the ratio of 5:2, provided the drying time exceeds 30 min.
- Collapsing in the usual manner to produce a solid glass rod called preform.
- Fibre drawing is conventional.

Reference may also be made to DiGiovanni D. J., SPIE Vol. 1373 (1990) p-2 "Fabrication of rare-earth-doped optical fibre' wherein the substrate tube with the porous core layer is soaked in an aqueous or alcoholic solution containing a nitrate or chloride of the desired RE ion. The tube is drained, dried and remounted on lathe. The dehydration is carried out by flowing dry chlorine through the tube at about 900° C. for an hour. After dehydration, the layer is sintered and the tube is collapsed to be drawn to fibre.

Reference may also be made to Ainslie B. J., Craig S. P., Davey S. T., and Wakefield B., Material Letters, Vol. 6, (1988) p-139, "The fabrication, assessment and optical properties of high-concentration $Nd^{3+}$ and $Er^{3+}$ doped silica based fibres" wherein optical fibres based on $Al_2O_3$—$P_2O_5$.—$SiO_2$ host glass doped with high concentrations of $Nd^{3+}$ and $Er^{3+}$ have been fabricated by solution method and quantified. Following the deposition of cladding layers $P_2O_5$ doped silica soot is deposited at lower temperature. The prepared tubes are soaked in an alcoholic solution of 1M $Al(NO_3)_3$+various concentrations of $ErCl_3$ and $NdCl_3$ for 1 hour. The tubes are subsequently blown dry and collapsed to make preforms in the usual way. Aluminium (Al) is said to be a key component in producing high RE concentrations in the core centre without clustering effect. It is further disclosed that Al and RE profile lock together in some way which retards the volatility of RE ion. The dip at the core centre is observed both for P and $GeO_2$.

Reference may also be made to U.S. Pat. No. 5,005,175 (1991) by Desuvire et al., 'Erbium doped fiber amplifier" wherein the fibre for the optical amplifier comprises a single mode fibre doped with erbium in the core having a distribution profile of the RE ion whose radius is less than 1.9 $\mu m$ while the radius of the mode of the pump signal exceeds 3 $\mu m$. The numerical aperture (NA) of the fibres varies from 0.2 to 0.35 and the core is doped with both Al and Ge oxides to increase the efficiency. The fibre with such design is reported to have increased gain and lower threshold compared to the conventional Er doped fibre amplifiers.

Reference may also be made to U.S. Pat. No. 5,778,129 (1998) by Shukunami et. al., 'Doped optical fibre having core and clad structure for increasing the amplification band of an optical amplifier using the optical fibre' wherein the porous core layer is deposited after developing the cladding inside a quartz tube by MCVD process and solution doping method is employed to impregnate Er as the active ion into the porous core to be followed by vitrification and collapsing for making the preform. The solution also contain compounds of Al, say chlorides, for co-doping of the core with Al in order to expand the amplification band. The Er and Al doped glass constitutes first region of the core. Surrounding this are the second and third regions of the core. The third region contains Ge to increase the refractive index. The second region has an impurity concentration lower than both those of first and third regions and consequently low RI also. The second region acts as a barrier to prevent diffusion of the active dopant.

Reference may also be made to U.S. Pat. No. 5,474,588 (1995) by Tanaka, D. et. al., 'Solution doping of a silica with erbium, aluminium and phosphorus to form an optical fiber' wherein a manufacturing method for Er doped silica is described in which silica glass soot is deposited on a seed rod (VAD apparatus) to form a porous soot preform, dipping the said preform into an ethanol solution containing an erbium compound, an aluminium compound and a phosphoric ester, and desiccating said preform to form Er, Al and P containing soot preform. The desiccation is carried out for a period of 24–240 hours at a temperature of 60°–70° C. in an atmosphere of nitrogen gas or inert gas. This desiccated soot preform is heated and dehydrated for a period of 2.5–3.5 hours at a temperature of 950°–1050° C. in an atmosphere of helium gas containing 0.25 to 0.35% chlorine gas and further heated for a period of 3–5 hours at a temperature of 1400°–1600° C. to render it transparent, thereby forming an erbium doped glass preform. The segregation of $AlCl_3$ in the preform formation process is suppressed due to the presence of phosphorus and as a result, the doping concentration of Al ions can be set to a high level (>3 wt %). The dopant concentration and component ratio of Er, Al and P ions are claimed to be extremely accurate and homogeneous in radial as well as in longitudinal directions.

Reference may also be made to U.S. Pat. No. 5,123,940 (1992) by DiGiovanni et. al., 'Sol-Gel doping of optical fibre preform' wherein the method comprises collapsing a silica—based glass tube to make a preform and drawing fibre from the preform. Before collapsing the tube, one or more glass layers are formed in the inner surface of the glass tube by dip-coating with a stable dispersion (sol) containing the metal-alkoxides and dopant cations including RE-ions. The metal-alkoxides dissolved in an alcoholic or aquous solvent contains required quantity of the dopants, polymerising the sol to form a gel, drying and sintering the tube. A wide variety of dopant materials, in the form of salts or alkoxides are easily incorporated by dissolving them in the solvent. The method suffers disadvantage that there is a possibility of evaporation of the RE-salts during sintering at high temperature, there by causing inhomogeneous distribution of RE-ions through out the length of the preform.

Reference may also be made to the publication by Matejec et al., 'Properties of optical fibre preforms prepared by inner coating of substrates tubes' Ceramics-Silicaty, 45 (2), 62 (2001) wherein the method consists of collapsing a silica based glass tube containing the required dopant cations to a preform and drawing fibre from the preform. Before collapsing the tube, one or more glass layers are formed in the inner surface of the glass tube by raising and lowering the sol level at a fixed velocity. The sol contained the silicon tetraethoxide (TEOS) and dopant cations including RE-ions. The TEOS dissolved in an alcoholic or aqueous solvent contains required quantity of the dopants, polymerizing the sol to form a gel followed by drying and sintering the tube. The main disadvantage of the method is that there is every possibility of evaporation of the RE salts during sintering at a high temperature, resulting in an inhomogeneous distribution of RE-ions throughout the length of the preform.

A few of the Drawbacks of the Above Mentioned Processes are as Follows:

1. Deposition of porous silica soot layer at a temperature of 1200–1400° C. by Chemical Vapour Deposition (CVD) process inside a substrate silica tube or on a seed rod (VAD or OVD apparatus).
2. The porosity of the soot layer controls the RE incorporation and the homogeneity along the length of the preform.
3. The control of porosity of the deposited unsintered layer is difficult as it is extremely sensitive to the deposition temperature, burner traverse speed and flow of the reactant materials. This leads to variation in soot density and composition along the length of the tube.
4. The dipping procedure of the soot containing preform into the RE solution is critical due to the possibility of generation of local imperfections and concentration variation in the core of the preform.
5. Minor variation in dipping parameters coupled with the porosity of the unsintered soot layer leads to considerable change in RE concentration as well as radial distribution in the core of the preform.
6. The dipping parameters and the porosity of the soot layer are critical to obtain good core-clad interface and minimise attenuation of the fibre.
7. The dopant materials are concentrated in the pores of the deposited layer. As a result, clusters or microcryastallites of dopants tend to form both before sintering and during the steps of sintering and collapsing of the glass materials, giving rise to inhomogenuous distribution of the dopant materials.
8. Formaton of microcrystallites causes scattering of light and increases the attenuation of the fibre.
9. Evaporation of the solvent leaves behind a residue containing the salt of the dopant cations or RE oxychloride which during dehydration in the chlorine atmosphere or sintering at high temperature volatilises, creating a dip in concentration near the inner surface of the porous layer.
10. Dehydration and sintering of the RE chloride impregnated soot layer give rise to compositional variation due to the vaporization of the dopant salt as well as $GeO_2$ in the core.
11. The process suffers from reliability/repeatability due to its sensitivity to the parameters during various stages of processing such as deposition, solution doping, drying and sintering.

OBJECTS OF THE INVENTION

The main object of the present invention is to provide a process for making rare earth doped optical fibre which obviates the drawbacks as detailed above.

Another object of the present invention is to provide a method of fabricating RE doped preforms and optical fibres by using RE coated silica nanoparticles as precursors.

Still another object of the present invention is to prepare RE (Er, Nd, Eu etc.) coated silica nanoparticles by a known technique. (Ref: 'Sonochemical Preparation and Characterization of $Eu_2O_3$ and $Tb_2O_3$ Doped in and Coated on Silica and Alumina Nanoparticles', A. Patra, E. Sominska, S. Ramesh, Yu. Koltypin, Z. Zhong, H. Minti, R. Reisfeld and A. Gedanken, J. Phys. Chem. B, Vol 103 (17) pp 3361–3365).

Yet another object of the present invention is to disperse the rare-earth coated silica nanoparticles in sol under sonication containing germanium tetraethoxide and aluminium salt.

Still another object of the present invention is to control the viscosity of the sol and apply a sol-gel thin film inside high purity silica glass tube by the dip coating technique.

Yet another object of the present invention is to optimize the liffing speed for controlling the thickness of the coating to maintain the desired clad-core dimensions in the preform.

Still another object of the present invention is to control the viscosity of the sol, pH and the lifting speed to obtain homogeneous and uniform coating along the length of the tube.

Yet another object of the present invention is to optimize the loading percentage of the nanoparticles and other codopants in the sol.

Still another object of the present invention is to reduce the possibility of change in composition of the particulate core layer due to evaporation of the RE salt during drying and sintering.

Yet another object of the present invention is to produce preforms with desired RE concentration in the core and good homogeneity along the length of the preform.

Still another object of the present invention is to reduce the time period of processing the silica tube at high temperature for fabrication of RE doped preforms.

Yet another object of the present invention is to reduce the number of steps of the process to make the process more simple and economic.

Still another object of the present invention is to process the tube at ambient temperature before sintering and collapsing instead of high temperature involved in the CVD process to make it more simple and economic.

Yet another object of the present invention is to reduce the requirement of precision equipments for fabrication and consequently reduce the capital investment and cost of the product.

Still another object of the present invention is to provide a process where the numerical aperture of the fibre is varied from 0.0 to 0.30 maintaining RE concentration in the core between 50 to 5000 ppm along to produce fibres suitable for application as amplifiers, fibre lasers and sensors for different purposes.

Yet another object of the present invention is to make the process less sensitive to the process parameters and consequently make it more reliable and economic.

SUMMARY OF THE INVENTION

The novelty of the present invention lies in eliminating the step of the formation of porous soot layer at high temperature (1000° C. or above) by CVD process inside a fused silica glass tube for formation of the core. Instead a thin silica gel coating containing other dopants in desired proportions is applied through a silica sol at ambient temperature. The above method ensures a better control of the characteristics of the coated layer and uniformity along the length of the tube. The inventive step further includes elimination of the step of the incorporation of the rare-earth ions into the porous soot layer following the solution-doping technique. The rare-earth oxide coated silica nanoparticles are dispersed at ambient temperature in the silica sol mentioned above under sonication thereby further eliminating the formation of microcrystallites and clusters of rare-earth ions. The elimination of the possibility of evaporation of RE salts at high temperatures due to the direct addition of RE oxides is another inventive step of the process which prevents change in composition including variation of RE concentration in the core and also reduces the possibility of formation of RE dip at the core centre. The RE incorporation efficiency is much higher than the conventional processes. The process thus ensures better control of RE concentration in the doped region and homogeneous distribution of RE ions along the radial direction as well as the longitudinal direction. As a result the reproducibilty and reliability of the process increase to a great extent. The addition of $Ge(OET)_4$ at ambient temperature in the silica sol above reduces the quantity of $GeCl_4$ which is required at high temperature to achieve the desired NA. All the steps combined make the process simple and more economic than the conventional processes.

DETAILED DESCRIPTION OF THE INVENTION

Accordingly, the present invention provides a process of making rare earth doped optical fibre which comprises (a) obtaining rare earth oxide coated ($Eu_2O_3$, $Nd_2O_3$, $Tb_2O_3$, $Er_2O_3$ etc.) silica nanoparticles by sonochemical method, (b) preparation of stable dispersions of the above RE containing powders in the desired proportion in presence of suitable dopants like $Al_2O_3$, $GeO_2$ etc. in a silica sol of $Si(OC_2H_5)_4$ under sonication, (c) applying a thin coating of the silica sol on the inner surface of high purity clear fused silica glass tubes by sol-gel dip coating technique, (d) drying the coated layer in air at 70 to 150° C., (e) mounting the tube on glass working lathe for processing by MCVD technique, (f) dehydrating the coated layer inside the tube at a temperature in the range of 800–1200° C. in presence of excess $Cl_2$, (g) sintering the coated layer in presence of a mixture of oxygen and helium in the temperature range of 1400 to 1800° C. for formation of the core, (h) collapsing the tube by usual method at a temperature in the range of 2000–2300° C. to obtain a preform, (i) overcladding the preform with silica tube and (j) drawing fibres of standard dimensions from the preform by the conventional methods.

In an embodiment of the present invention, the RE oxide is selected from $EU_2O_3$, $Nd_2O_3$, $Tb_2O_3$ and $Er_2O_3$ for preparation of the silica nanoparticles.

In another embodiment of the present invention, $P_2O_5$ and F doped synthetic cladding is deposited within a silica glass substrate tube prior to development of the coating by known method like Modified Chemical Vapour Deposition (MCVD) process to obtain matched or depressed clad type structure in the preform.

In a further embodiment of the present invention, particle size of the RE coated $SiO_2$ powders ranges from 50 to 200 nm.

In still another embodiment of the present invention, the composition in oxide mol % of $SiO_2:RE_2O_3$ in $RE_2O_3$ coated $SiO_2$ powders varies from 99.5:0.5 to 95:5.

In yet another embodiment of the present invention, the equivalent oxide mol % of $SiO_2$ in the dispersion varies from 98.5 to 90.5.

In still another embodiment of the present invention, a silica sol prepared with $Si(OC_2H_5)_4$ was used as the diluent of the $RE_2O_3$ coated silica powder.

In yet another embodiment of the present invention, the equivalent oxide mol % of $GeO_2$ in the dispersion varies from 1.0 to 5.0.

In still another embodiment of the present invention, $GeO_2$ was added through $Ge(OC_2H_5)_4$ in the silica sol.

In yet another embodiment of the present invention, the equivalent oxide mol % of $Al_2O_3$ in the dispersion ranges from 0.5 to 4.0.

In further embodiment of the present invention, $Al_2O_3$ is provided to the solvent in the form of aluminium salts such as chlorides, nitrates or any other salt soluble in the solvent.

In yet another embodiment of the present invention, solution of aluminium salt is prepared using a solvent selected from alcohol and water.

In still another embodiment of the present invention, the oxide mol % of $RE_2O_3$ in the dispersion ranges from 0.01 to 0.60.

In yet another embodiment of the present invention, strong mineral acids used for preparing the sol for dispersion are selected from hydrochloric or nitric acid.

In still another embodiment of the present invention, the alcohol selected is soluable in the dispersion system.

In yet another embodiment of the present invention, the alcohol is selected from the group comprising of methyl alcohol, ethyl alcohol, propan-1-ol, propan-2-ol, butan-1-ol and butan-2-ol.

In yet another embodiment of the present invention, pH of the dispersion ranges from 1 to 5.

In still another embodiment of the present invention viscosity of the dispersion varies from 1 to 10 mPa s.

In yet another embodiment of the present invention sonication time of the dispersion ranges from 30 to 200 minutes.

In still another embodiment of the present invention settling time of the dispersion varies from 1 to 10 hours.

In yet another embodiment of the present invention lifting speed of the tube from the dispersion ranges from 4 to 15 cm/min.

In still another embodiment of the present invention baking temperature of the coated tube varies from 70° to 150° C.

In yet another embodiment of the present invention baking time of the coated tube ranges from 0.5 to 5 h.

In still another embodiment of the present invention the core composition is selected from the group comprising of $RE_2O_3+SiO_2+GeO_2$, $RE_2O_3+SiO_2+GeO_2+Al_2O_3$, $RE_2O_3+SiO_2+GeO_2+Al_2O_3+P_2O_5$ and $RE_2O_3+SiO_2+GeO_2+P_2O_5$.

In still another embodiment of the present invention the temperature of the RE oxide containing core layer is increased in steps of 50 to 200° C. during sintering depending on the composition and Al/RE concentration of the core layer.

In yet another embodiment of the present invention, the mixture of $O_2$ and He is in the range of 3:1 to 9:1 during sintering.

In still another embodiment of the present invention, source of chlorine is $CCl_4$ where helium is used as carrier gas.

In yet another embodiment of the present invention, the proportion of $Cl_2:O_2$ during drying varies from 1.5:1 to 3.5:1.

In still another embodiment of the present invention, the dehydration period lies between 1 to 2 hours.

In yet another embodiment of the present invention, the core layer is sintered in the presence of germania to facilitate germania incorporation and to obtain appropriate numerical aperture value.

In still another embodiment of the present invention, germania is supplied to the core layer during sintering by including $GeCl_4$ with the input oxygen.

In another embodiment of the present invention, the sintering is carried out at a temperature of 1200° C. to 1400° C.

In yet another embodiment of the present invention, depending on the composition of the core, $POCl_3$ is added to the input gas mixture during sintering.

In another embodiment of the present invention, the core layer is doped with $P_2O_5$ to facilitate RE incorporation.

In still another embodiment of the present invention $P_2O_5$ and $GeO_2$ concentrations vary from 0.5 to 5.0 mol % and 3.0 to 25.0 mol % respectively in the RE doped core layer of the preform.

In yet another embodiment of the present invention the numerical aperture of the fibre is varied from 0.10 to 0.30.

In another embodiment of the present invention, RE concentration in the core is maintained in the range of 50 to 4000 ppm to produce fibres suitable for application as amplifiers, fibre lasers and sensors or different purposes.

In a further embodiment of the present invention, codopants like Al and other rare earths are added to the core doped with a selected RE to fabricate fibres containing various dopants in the core in the concentration range of 50 to 5000 ppm and numerical aperture varying between 0.10 and 0.30.

In still another embodiment of the present invention the deposition of a porous soot layer at high temperature (1000° C. or above) by CVD process inside a fused silica glass tube or on a seed rod (VAD or OVD apparatus) is eliminated for formation of the core. In yet another embodiment of the present invention better control is achieved over the characteristics of the coated layer like porosity, thickness etc. and uniformity along the length of the tube.

In still another embodiment of the present invention the difficulties and uncertainties involved in incorporation of the rare-earth ions in desired concentration into the porous soot layer by the solution-doping technique and such other methods are eliminated.

In still another embodiment of the present invention the rare-earth oxide coated silica nanoparticles are dispersed at ambient temperature in the silica sol mentioned above under sonication thereby eliminating the possibility of formation of the microcrystallites and clusters of rare-earth ions as in the conventional techniques.

In yet another embodiment of the present invention the possibility of evaporation of RE salts at high temperatures is considerably eliminated due to the direct addition of RE oxides which prevents change in composition including variation of RE concentration in the core and also reduces the possibility of formation of RE dip at the core centre.

In still another embodiment of the present invention the process ensures better control of RE concentration in the doped region and homogeneous distribution of RE ions along the radial direction as well as throughout the length of the preform.

In yet another embodiment of the present invention the RE incorporation efficiency is much higher compared to the conventional techniques beacuse of direct addition of the RE oxides into the dispersion instead of the corresponding salt by the conventional techniques thereby minimising the possibility of evaporation and change in concentration.

In still another embodiment of the present invention the addition of $Ge(OC_2H_5)_4$ at ambient temperature in the silica sol above reduces the quantity of $GeCl_4$ which is required at high temperature to achieve the desired NA.

In yet another embodiment of the present invention the time period of processing the silica tube at high temperature and the number of steps involved for doping of RE ions by the conventional techniques for fabrication of the preform are considerably reduced.

In still another embodiment of the present invention the processing of the tube at ambient temperature before sintering and collapsing instead of high temperature involved in the CVD process makes the process less sensitive to the process parameters unlike the conventional processes.

In still another embodiment of the present invention the advantages described above increases the reproducibilty and reliability of the process to a great extent.

In yet another embodiment of the present invention the requirement of precision equipments for control of porous soot deposition, RE incorporation etc. during fabrication of the preform is considerably eliminated which will reduce the capital investment and cost of the product.

In still another embodiment of the present invention the advantages combined make the process simple and more economic than the conventional processes.

Figure 1:
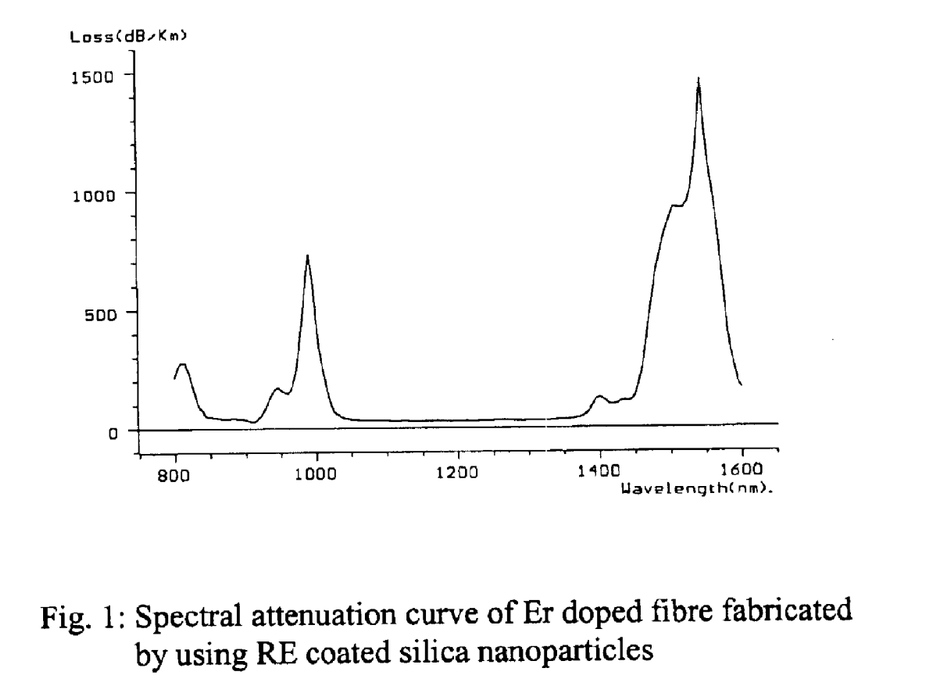
FIGS. 1 & 2 represent respectively the spectral attenuation curve of Er doped fibre prepared from RE doped nanoparticles following the present process and that fabricated by conventional solution doping technique.
Figure 2:
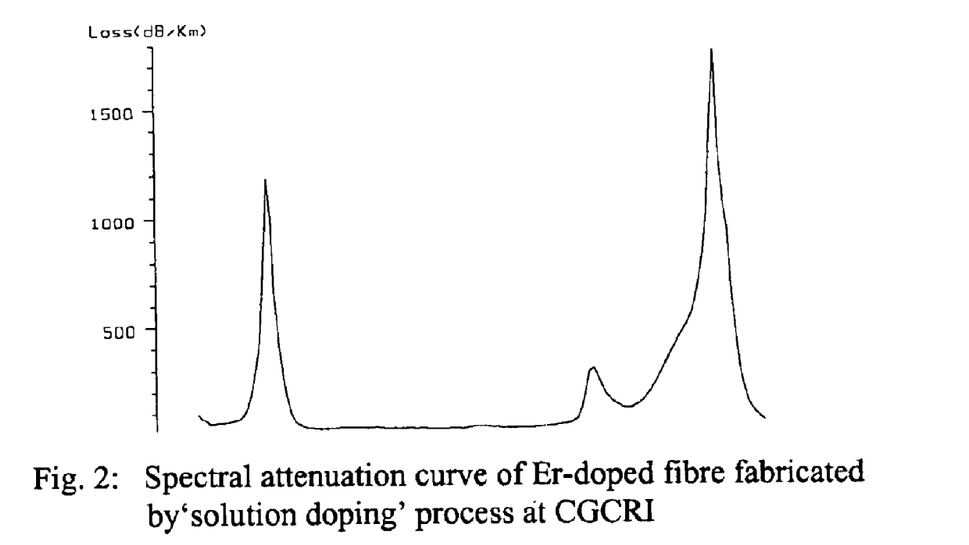
Figure 3:
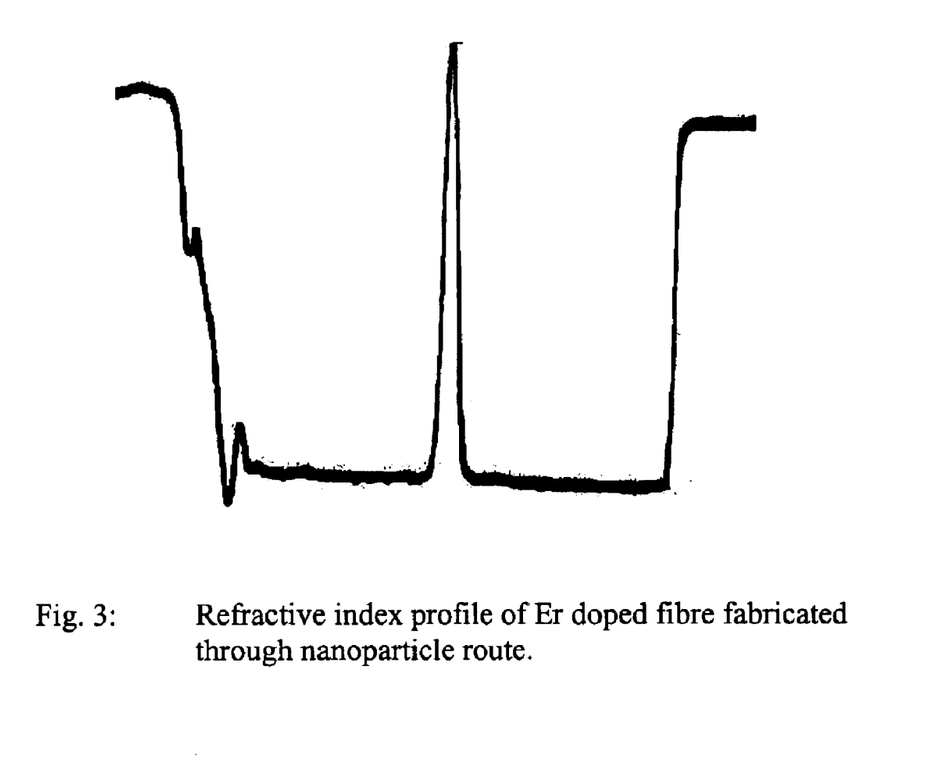
FIGS. 3 & 4 show the refractive index profiles of Er doped fibre prepared through nanoparticle route and that by solution doping method respectively.
Figure 4:
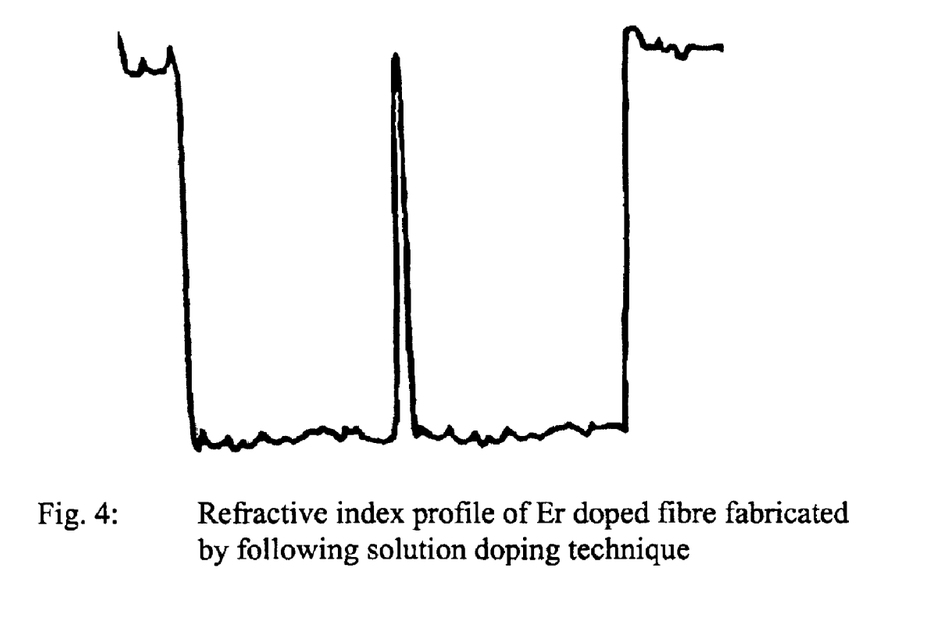

The invention is further explained with the help of following examples which should not be construed to limit the scope of the invention:

Sonochemical preparation of $RE_2O_3$-coated silica nanoparticles following the process mentioned in the Ref: 'Sonochemical Preparation and Characterization of $Eu_2O_3$ and $Tb_2O_3$ Doped in and Coated on Silica and Alumina Nanoparticles' A. Patra, E. Sominska, S. Ramesh, Yu. Koltypin, Z. Zhong, H. Minti, R. Reisfeld and A. Gedanken, J. Phys. Chem. B, Vol 103 (17) pp 3361–3365. (It does not form a part of the invention )

Amorphous silica microspheres in the size range of 50–250 nm were synthesized by the alkaline hydrolysis of tetraethoxysilane (Stober method). For the preparation of the $RE_2O_3$-coated silica nanoparticles with molar composition (100-x)$SiO_2$-x$RE_2O_3$, nanophased rare earth oxides were sonochemically deposited on the outer surface of spherical silica particles. For this purpose, rare earth nitrate used as the source of rare earth was prepared by dissolving rare earth oxide in a minimum amount of nitric acid followed by evaporating it to dryness. The dry nitrate was dissolved in calculated quantity of water to prepare the rare earth nitrate solution.

The required amount of silica microspheres was taken in a beaker and calculated quantity of water and rare earth nitrate solution, as prepared earlier, were then added to it. The open beaker with the material was kept in an ice-bath and subjected to sonication for 1 h employing a direct immersion titanium horn (Vibracell, 20 kHz, 100 W/cm$^2$). Required amount of 25% aqueous ammonia was thereafter added in drops into the beaker during sonication. The resulting product after sonication was washed thoroughly with water, centrifuged and finally dried under vacuum to obtain RE coated amorphous silica nanoparticles.

The above method is also suitable for the preparation of doped and co-doped silica particles containing $Al_2O_3$, $GeO_2$, $Yb_2O_3$ and other rare earth oxides.

EXAMPLE 1

Er-doped Fibre

Amorphous silica microspheres synthesized by hydrolysis of tetraethoxyorthosilicate (Stober method) were dispersed in a solution of erbium nitrate (kept in an ice bath) in a proportion of 98.5 mol % $SiO_2$ and 1.5 mol % $Er_2O_3$ under sonication followed by the addition of aqueous ammonia by known process. The resulting product was washed with water followed by centrifugation and drying under vacuum.

A stable dispersion of composition 94.98$SiO_2$:3$GeO_2$:2$Al_2O_3$:0.02$Er_2O_3$ (in equivalent oxide mol %) was prepared for the application of coating to the inner wall of high purity clear fused silica glass tubes.

From the erbium oxide ($Er_2O_3$) coated silica powders with 98.5 mol % $SiO_2$ and 1.5 mol % $Er_2O_3$, a silica sol of composition of 94.98 equivalent mol % of $SiO_2$ and 0.02 equivalent mol % of $Er_2O_3$ was prepared by diluting with a slica sol containing the desired amount of silicon tetraethoxide (TEOS).

Silica-germania sol containing 3 equivalent oxide mol % of germanium ethoxide [Ge(OC$_2$H$_5$)$_4$] was prepared through the hydrolysis of TEOS and [Ge(OC$_2$H$_5$)$_4$] with water and hydrochloric acid in presence of a mixed solvent of propan-1-ol and butan-2-ol. pH of the above sol was 1.5±0.05.

2 equivalent oxide mol % of [Al(NO$_3$)$_3$.9H$_2$O] and 0.02 equivalent mol % of $Er_2O_3$ through $Er_2O_3$ coated $SiO_2$ powders (after baking at 100° C. for 1 h) were dispersed in the above silica sol under sonication (26 kHz) for 80 mins.

The resultant dispersion after allowing to settle for 2 h, was used to coat the inner wall of the throughly cleaned silica glass tubes with inner diameter of 17.8 mm. The outer wall of the tubes were properely masked with a suitable substance (parafilm).

Coating was performed by dipping the silica glass tubes with a speed of 8 cm/min into the dispersion and lifting the same tube from the above dispersions with the same speed.

The coated tubes were dried in air at 100° C. for 1 h.

Oxidation at temperatures of 660°, 750°, 850° and 940° C. with 2 passes of the burner at each temperature maintaining a constant He/$O_2$ ratio of 1:5.

The dehydration was carried out at a temperature of 930° C. with a Cl$_2$:$O_2$ ratio of 2.25:1 for a period of one hour.

For sintering the temperature was increased in 3 steps up to 1220° C., each step consisting of 2 passes of the burner. GeCl$_4$ was added in controlled quantities during this stage with the input oxygen with two passes at 1220° C. and one pass at 1425° C. in order to adjust the NA of the preform/fibre.

The tube was further heated to increase the temperature stepwise to 1650° C. for complete sintering of the Ge, Er & Al containing coated layer. During sintering $O_2$ and He flow was in the ratio of of 5:1.

The collapsing was done in 3 steps in the usual manner with positive oxygen pressure of 4 psi inside the tube to avoid any deformation in shape or geometry and excessive evaporation of $GeO_2$ or other oxides from the core.

Overcladding was done to reduce the core:clad ratio to 3.4:125. The NA measured in the fibre was 0.21±0.01.

The Er$^{3+}$ ion concentration in the fibre was 220 ppm approx. as measured from the absorption at selected wavelengths.

EXAMPLE 2

Nd-doped Fibre

Amorphous silica microspheres synthesized by hydrolysis of tetraethoxyorthosilicate (Stober method) were dispersed in a solution of Neodimium nitrate (kept in an ice bath) in a proportion of 98.5 mol % $SiO_2$ and 1.5 mol % $Nd_2O_3$ under sonication followed by the addition of aqueous ammonia by known process. The resulting product was washed with water followed by centrifugation and drying under vacuum.

A stable dispersion of composition 94.8$SiO_2$:3$GeO_2$:2$Al_2O_3$:0.20$Nd_2O_3$ (in equivalent oxide mol %) was prepared for the application of coating to the inner wall of high purity clear fused silica glass tubes.

From the Neodimium oxide ($Nd_2O_3$) coated silica powders with 98.5 mol % $SiO_2$ and 1.5 mol % $Nd_2O_3$, a silica sol of composition of 94.8 equivalent mol % of $SiO_2$ and 0.20 equivalent mol % of $Nd_2O_3$ was prepared by diluting with a slica sol containing the desired amount of silicon tetraethoxide (TEOS).

Silica-germania sol containing 3 equivalent oxide mol % of germanium ethoxide [Ge(OC$_2$H$_5$)$_4$] was prepared through the hydrolysis of TEOS and [Ge(OC$_2$H$_5$)$_4$] with water and hydrochloric acid in presence of a mixed solvent of propan-1-ol and butan-2-ol. pH of the above sol was 1.2±0.05.

2 equivalent oxide mol % of $[Al(NO_3)_3.9H_2O]$ and 0.20 equivalent mol % of $Nd_2O_3$ through $Nd_2O_3$ coated $SiO_2$ powders (after baking at 100° C. for 5 h) were dispersed in the above silica sol under sonication (26 kHz) for 80 mins.

The resultant dispersion after allowing to settle for 2 h, was used to coat the inner wall of the throughly cleaned silica glass tubes with inner diameter of 17.9 mm. The outer wall of the tubes were properely masked with a suitable substance (parafilm).

Coating was performed by dipping the silica glass tubes with a speed of 6 cm/min into the dispersion and lifting the same tube from the above dispersions with the same speed.

The coated tubes were dried in air at 80° C. for 1.5 h.

Oxidation at temperatures of 700°, 820° and 910° C. with 2 passes of the burner at each temperature maintaining a constant $He/O_2$ ratio of 1:6.

The dehydration was carried out at a temperature of 900° C. with a $Cl_2:O_2$ ratio of 2.5:1 for a period of 1.25 hour.

For sintering the temperature was increased in 4 steps up to 1225° C., each step consisting of 2 passes of the burner. $GeCl_4$ was added in controlled quantities during this stage with the input oxygen with two passes at 1225° C. and one pass at 1400° C. in order to adjust the NA of the preform/fibre.

The tube was further heated to increase the temperature stepwise to 1600° C. for complete sintering of the Ge, Nd & Al containing coated layer. During sintering $O_2$ and He flow was in the ratio of of 4:1.

The collapsing was done in 3 steps in the usual mariner with positive oxygen pressure of 4 psi inside the tube to avoid any deformation in shape or geometry and excessive evaporation of $GeO_2$ or other oxides from the core.

Overcladding was done to reduce the core:clad ratio to 3.5:125. The NA measured in the fibre was 0.22±0.01.

The $Nd^{3+}$ ion concentration in the fibre was 2350 ppm approx. as measured from the absorption at selected wavelengths.

EXAMPLE 3

Eu-doped Fibre

Amorphous silica microspheres synthesized by hydrolysis of tetraethoxyorthosilicate (Stober method) were dispersed in a solution of europium nitrate (kept in an ice bath) in a proportion of 99.0 mol % $SiO_2$ and 1.0 mol % $Eu_2O_3$ under sonication followed by the addition of aqueous ammonia by known process. The resulting product was washed with water followed by centrifugation and drying under vacuum.

A stable dispersion of composition $95.99SiO_2:3GeO_2:1Al_2O_3:0.01\ Eu_2O_3$ (in equivalent oxide mol %) was prepared for the application of coating to the inner wall of high purity clear fused silica glass tubes.

From the europium oxide ($Eu_2O_3$) coated silica powders with 99.0 mol % $SiO_2$ and 1.0 mol % $Eu_2O_3$, a silica sol of composition of 95.99 equivalent mol % of $SiO_2$ and 0.01 equivalent mol % of $Eu_2O_3$ was prepared by diluting with a slica sol containing the desired amount of silicon tetraethoxide (TEOS).

Silica-germania sol containing 3 equivalent oxide mol % of germanium ethoxide $[Ge(OC_2H_5)_4]$ was prepared through the hydrolysis of TEOS and $[Ge(OC_2H_5)_4]$ with water and hydrochloric acid in presence of a mixed solvent of propan-1-ol and butan-2-ol. pH of the above sol was 1.0±0.05.

1 equivalent oxide mol % of $[Al(NO_3)_3.9H_2O]$ and 0.01 equivalent mol % of $Eu_2O_3$ through $Eu_2O_3$ coated $SiO_2$ powders (after baking at 100° C. for 1 h) were dispersed in the above silica sol under sonication (26 kHz) for 80 mins.

The resultant dispersion after allowing to settle for 2 h, was used to coat the inner wall of the throughly cleaned silica glass tubes with inner diameter of 17.8 mm. The outer wall of the tubes were properely masked with a suitable substance (parafilm).

Coating was performed by dipping the silica glass tubes with a speed of 10 cm/min into the dispersion and lifting the same tube from the above dispersions with the same speed.

The coated tubes were dried in air at 100° C. for 1 h.

Oxidation at temperatures of 610°, 700°, 825° and 950° C. with 2 passes of the burner at each temperature maintaining a constant $He/O_2$ ratio of 1:5.

The dehydration was carried out at a temperature of 1000° C. with a $Cl_2:O_2$ ratio of 2:1 for a period of one hour.

For sintering the temperature was increased in 4 steps up to 1220° C., each step consisting of 2 passes of the burner. $GeCl_4$ was added in controlled quantities during this stage with the input oxygen with two passes at 1220° C. in order to adjust the NA of the preform/fibre.

The tube was further heated to increase the temperature stepwise to 1600° C. for complete sintering of the Ge, Eu & Al containing coated layer. During sintering $O_2$ and He flow was in the ratio of of 4:1.

The collapsing was done in 3 steps in the usual manner with positive oxygen pressure of 4 psi inside the tube to avoid any deformation in shape or geometry and excessive evaporation of $GeO_2$ or other oxides from the core.

The core:clad ratio before overcladding was 7.2:125. The NA measured in the fibre was 0.14±0.01.

The presence of Eu in the core was established from the characteristic fluoresence at 624 nm in the preform sample when excited at 392 nm.

Spectral attenuation was measured in the fibre from 400 nm to 800 nm.

EXAMPLE 4

Tb-doped Fibre

Amorphous silica microspheres synthesized by hydrolysis of tetraethoxyorthosilicate (Stober method) were dispersed in a solution of terbium nitrate (kept in an ice bath) in a proportion of 98.5 mol % $SiO_2$ and 1.5 mol % $Tb_2O_3$ under sonication followed by the addition of aqueous ammonia by known process. The resulting product was washed with water followed by centrifugation and drying under vacuum.

A stable dispersion of composition $95.9SiO_2:2GeO_2:2Al_2O_3:0.1Tb_2O_3$ (in equivalent oxide mol %) was prepared for the application of coating to the inner wall of high purity clear fused silica glass tubes.

From the terbium oxide ($Tb_2O_3$) coated silica powders with 98.5 mol % $SiO_2$ and 1.5 mol % $Tb_2O_3$, a silica sol of composition of 95.9 equivalent mol % of $SiO_2$ and 0.1 equivalent mol % of $Tb_2O_3$ was prepared by diluting with a slica sol containing the desired amount of silicon tetraethoxide (TEOS).

Silica-germania sol containing 2 equivalent oxide mol % of germanium ethoxide $[Ge(OC_2H_5)_4]$ was prepared through the hydrolysis of TEOS and $[Ge(OC_2H_5)_4]$ with water and hydrochloric acid in presence of a mixed solvent of propan-1-ol and butan-2-ol. pH of the above sol was 1.2±0.05.

2 equivalent oxide mol % of $[Al(NO_3)_3.9H_2O]$ and 0.1 equivalent mol % of $Tb_2O_3$ through $Tb_2O_3$ coated $SiO_2$ powders (after baking at 100° C. for 1 h) were dispersed in the above silica sol under sonication (26 kHz) for 80 mins.

The resultant dispersion after allowing to settle for 2 h, was used to coat the inner wall of the throughly cleaned silica glass tubes with inner diameter of 20.1 mm. The outer wall of the tubes were properely masked with a suitable substance (parafilm).

Coating was performed by dipping the silica glass tubes with a speed of 10 cm/min into the dispersion and lifting the same tube from the above dispersions with the same speed.

The coated tubes were dried in air at 150° C. for 0.5 h.

Oxidation at temperatures of 720°, 825° and 950° C. with 2 passes of the burner at each temperature maintaining a constant $He/O_2$ ratio of 1:6.

The dehydration was carried out at a temperature of 950° C. with a $Cl_2:O_2$ ratio of 2.5:1 for a period of one hour.

For sintering the temperature was increased in 3 steps up to 1200° C., each step consisting of 2 passes of the burner. $GeCl_4$ was added in controlled quantities with the input oxygen during the passes at 1200° C. in order to adjust the NA of the preform/fibre.

The tube was further heated to increase the temperature stepwise to 1650° C. for complete sintering of the Ge, Th & Al containing coated layer. During sintering $O_2$ and He flow was in the ratio of of 4:1.

The collapsing was done in 4 steps in the usual manner with positive oxygen pressure of 4 psi inside the tube to avoid any deformation in shape or geometry and excessive evaporation of $GeO_2$ or other oxides from the core.

Overcladding was done to reduce the core:clad ratio to 5:125. The NA measured in the fibre was 0.11±0.01.

The preform sample was excited at 355 nm and 400 nm and characteristic fluoresence of Tb was measured at 533 nm and 580 nm.

Spectral attenuation was measured in the fibre from 400 nm to 800 nm.

Comparison of the characteristics of RE-doped fibre, fabricated at CGCRI using RE-coated silica nano particles w.r.t. commercially available fibres for special applications

| Parameters | Commercial fibre | CGCRI fibre |
| --- | --- | --- |
| Clad composition | $SiO_2$ or $SiO_2$—$P_2O_5$—F | Same |
| Core composition | $SiO_2$ + $GeO_2$ + $Al_2O_3$ + $Er_2O_3$ (+$P_2O_5$) | Same |
| Numerical aperture | 0.15–0.30 | 0.10–0.30 |
| Cut-off wavelength | 850–1450 nm | 850–1450 nm |
| RE-ion concentration | 50–2000 ppm | 50–4000 ppm |
| Fibre diameter | 125 ± 1 μm | 125 ± 1 μm |
| Coating diameter | 245 μm (nominal) | 245 μm |
| Mode Field Diameter | 3.5–8.0 μm | 3.0–8.0 μm |

The Main advantages of the present invention are:

1. It provides a process of fabricating RE doped preforms and optical fibres by using RE coated silica nanoparticles as precursors. The RE (Er, Nd, Eu etc.) coated silica nanoparticles are prepared by sonochemical method.
2. The deposition of a porous soot layer at high temperature (1000° C. or above) by CVD process inside a fused silica glass tube or on a seed rod (VAD or OVD apparatus) is eliminated for formation of the core. Instead a thin silica gel coating containing other dopants in desired proportions is applied through a silica sol at ambient temperature.
3. The method described in 2 above ensures a better control of the characteristics of the coated layer like porosity, thickness etc. and uniformity along the length of the tube.
4. The difficulties and uncertainties involved in incorporation of the rare-earth ions in desired concentration into the porous soot layer by the solution-doping technique and such other methods are eliminated.
5. The rare-earth oxide coated silica nanoparticles are dispersed at ambient temperature in the silica sol mentioned above under sonication thereby eliminating the possibility of formation of the microcrystallites and clusters of rare-earth ions as in the conventional techniques.
6. The possibility of evaporation of RE salts at high temperatures is considerably in eliminated due to the direct addition of RE oxides which prevents change in composition including variation of RE concentration in the core and also reduces the possibility of formation of RE dip at the core centre.
7. The process ensures better control of RE concentration in the doped region and homogeneous distribution of RE ions along the radial direction as well as throughout the length of the preform.
8. The RE incorporation efficiency is much higher compared to the conventional techniques due to direct addition of the RE oxides in to the dispersion.
9. The numerical aperture of the fibre is varied from 0.10 to 0.30 maintaining RE concentration in the core between 50 to 4000 ppm to produce fibres suitable for application as amplifiers, fibre lasers and sensors or different purposes.
10. The addition of $Ge(OET)_4$ at ambient temperature in the silica sol above reduces the quantity of $GeCl_4$ which is required at high temperature to achieve the desired NA.
11. The time period of processing the silica tube at high temperature and the number of steps involved for doping of RE ions by the conventional techniques for fabrication of the preform are considerably reduced.
12. The processing of the tube at ambient temperature before sintering and collapsing instead of high temperature involved in the CVD process makes the process less sensitive to the process parameters unlike the conventional processes.
13. The advantages described above increases the reproducibilty and reliability of the process to a great extent.
14. The requirement of precision equipments for control of porous soot deposition, RE incorporation etc. during fabrication of the preform is considerably eliminated which will reduce the capital investment and cost of the product.
15. All the above advantages combined make the process simple and more economic than the conventional processes.

What is claimed is:

1. A process for making rare earth doped optical fiber comprising:
   using stable dispersions of rare earth (RE) coated silica nanoparticles to obtain silica sol; and
   applying a thin coating of said silica sol containing suitable dopants selected from a group consisting of Ge, Al, and P.

2. A process for making rare earth doped optical fiber, said process comprising:
   (a) obtaining rare earth (RE) oxide doped silica nanoparticles by sonochemical method;
   (b) preparing stable dispersions of the silica nanoparticles containing powders in presence of dopants in a silica sol of $Si(OC_2H_5)_4$ under sonication;
   (c) applying a thin coating of silica sol on an inner surface of high purity clear fused silica glass tubes by sol-gel dip coating technique;
   (d) drying the coated layer in air at 70° to 150° C.;
   (e) mounting the tube on glass working lathe for processing by MCVD technique;
   (f) dehydrating the coated layer inside the tube at a temperature in the range of 800–1200° C. in presence of excess $Cl_2$;
   (g) sintering the coated layer in presence of a mixture of oxygen and helium in the temperature range of 1400 to 1750° C. for formation of a core;
   (h) heating the tube gradually up to a temperature of 1900° C. for further consolidation of the sintered layer;
   (i) collapsing the tube by usual method at a temperature in the range of 2000–2300° C. to obtain a preform;
   (j) overcladding the preform with silica tube, and
   (k) drawing fibers of standard dimensions from the preform by the conventional methods.

3. A process as claimed in claim 2 wherein, the RE oxide is selected from $Eu_2O_3$, $Nd_2O_3$, $Tb_2O_3$ and $Er_2O_3$.

4. A process as claimed in claim 2 wherein, $P_2O_5$ and F doped synthetic cladding is deposited within a silica glass substrate tube prior to development of the coating to obtain matched or depressed clad type structure in the preform.

5. A process as claimed in claim 1 wherein, a particle size of the RE coated silica ranges from 50 to 200 nm.

6. A process as claimed in claim 1 wherein, the composition in oxide mol % of $SiO_2:Re_2O_3$ in RE coated silica varies from 99.5:0.5 to 95:5.

7. A process as claimed in claim 1 wherein, the equivalent oxide mol % of $SiO_2$ in the dispersion varies from 98.5 to 90.5.

8. A process as claimed in claim 1 wherein, a silica sol prepared with $Si(OC_2H_5)_4$ was used as the diluent of the RE coated silica nanoparticles.

9. A process as claimed in claim 1 wherein, the equivalent oxide mol % of an oxide of said Ge in the dispersion varies from 1.0 to 5.0.

10. A process as claimed in claim 1 wherein, $Ge^{4+}$ was added using $Ge(OC_2H_5)_4$ in the silica sol.

11. A process as claimed in claim 1 wherein, the equivalent oxide mol % of an oxide of said Al in the dispersion ranges from 0.5 to 4.0.

12. A process as claimed in claim 1 wherein, $Al_2O_3$ is provided to the solvent in the form of aluminium salts.

13. A process as claimed in claim 1 wherein, a solution of a salt of said Al is prepared using a solvent selected from alcohol and water.

14. A process as claimed in claim 3 wherein, the oxide mol % of $Er_2O_3$ in the dispersion ranges from 0.01 to 0.60.

15. A process as claimed in claim 1 wherein, hydrochloric acid or nitric acid is used for preparing the sol for dispersion.

16. A process as claimed in claim 13 wherein, the alcohol selected is soluable in the dispersion system.

17. A process as claimed in claim 16 wherein, the alcohol is selected from the group consisting of methyl alcohol, ethyl alcohol, propan-1-ol, propan-2-ol, butan-1-ol and butan-2-ol.

18. A process as claimed in claim 1 wherein, pH of the dispersion ranges from 1 to 5.

19. A process as claimed in claim 1 wherein, viscosity of the dispersion varies from 1 to 10 mPa s.

20. A process as claimed in claim 1 wherein, a sonication time of the dispersion ranges from 30 to 200 minutes.

21. A process as claimed in claim 1 wherein, a settling time of the dispersion varies from 1 to 10 hours.

22. A process as claimed in claim 2 wherein, a lifting speed of the tube from the dispersion ranges from 4 to 15 cm/minutes.

23. A process as claimed in claim 2 wherein, a baking temperature of the coated tube varies from 70° to 150° C.

24. A process as claimed in claim 2 wherein, a baking time of the coated tube ranges from 0.5 to 5 hours.

25. A process as claimed in claim 2 wherein, the core composition is selected from the group consisting of $RE_2O_3+SiO_2+GeO_2$, $RE_2O_3+SiO_2+GeO_2+Al_2O_3$, $RE_2O_3+SiO_2+GeO_2+Al_2O_3+P_2O_5$ and $RE_2O_3+SiO_2+GeO_2+P_2O_5$.

26. A process as claimed in claim 2 wherein, a temperature of the RE oxide containing core layer is increased in steps of 50 to 200° C. during the sintering depending on a composition and Al/RE concentration of the core.

27. A process as claimed in claim 2 wherein, the mixture of $O_2$ and He is in the range of 3:1 to 9:1 during sintering.

28. A process as claimed in claim 2 wherein, source of chlorine is $CCl_4$ where helium is used as carrier gas.

29. A process as claimed in claim 2 wherein, a proportion of $Cl_2:O_2$ during drying varies from 1.5:1 to 3.5:1.

30. A process as claimed in claim 2 wherein, a dehydration period lies between 1 to 2 hours.

31. A process as claimed in claim 2 wherein, the core is sintered in the presence of germania.

32. A process as claimed in claim 2 wherein, germania is supplied to the core during sintering by including $GeCl_4$ with the oxygen.

33. A process as claimed in claim 2 wherein, the sintering is carried out at a temperature of 1200° C. to 1400° C.

34. A process as claimed in claim 2 wherein, $POCl_3$ is added to the input gas mixture during sintering.

35. A process as claimed in claim 2 wherein, the core is doped with $P_2O_5$.

36. A process as claimed in claim 2 wherein, $P_2O_5$ and $GeO_2$ concentrations vary from 0.5 to 5.0 mol % and 3.0 to 25.0 mol % respectively in the RE doped core.

37. A process as claimed in claim 2 wherein, the numerical aperture of the fibre is varied from 0.10 to 0.30.

38. A process as claimed in claim 2 wherein, RE concentration in the core is maintained in the range of 50 to 4000 ppm.

39. A process as claimed in claim 2 wherein, codopants are added to the core in the concentration range 50 to 5000 ppm and numerical aperture varying between 0.10 and 0.30.

40. A process as claimed in claim 1 wherein, the rare-earth oxide coated silica nanoparticles are dispersed at ambient temperature in the silica sol under sonication.

* * * * *